United States Patent
Baldemair et al.

(10) Patent No.: US 10,680,854 B2
(45) Date of Patent: Jun. 9, 2020

(54) METHODS AND APPARATUSES FOR SIGNALING AND DETERMINING REFERENCE SIGNAL OFFSETS

(71) Applicant: Telefonaktiebolaget LM Ericsson (publ), Stockholm (SE)

(72) Inventors: Robert Baldemair, Solna (SE); Mattias Frenne, Uppsala (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 62 days.

(21) Appl. No.: 15/569,970

(22) PCT Filed: Sep. 25, 2017

(86) PCT No.: PCT/SE2017/050926
§ 371 (c)(1),
(2) Date: Oct. 27, 2017

(87) PCT Pub. No.: WO2018/128564
PCT Pub. Date: Jul. 12, 2018

(65) Prior Publication Data
US 2019/0089560 A1   Mar. 21, 2019

Related U.S. Application Data

(60) Provisional application No. 62/443,042, filed on Jan. 6, 2017.

(51) Int. Cl.
*H04L 25/02* (2006.01)
*H04L 27/26* (2006.01)
(Continued)

(52) U.S. Cl.
CPC ........ *H04L 25/0224* (2013.01); *H04L 5/0037* (2013.01); *H04L 5/0048* (2013.01);
(Continued)

(58) Field of Classification Search
None
See application file for complete search history.

(56) References Cited

U.S. PATENT DOCUMENTS 10,333,671 B2 * 6/2019 Seo .................. H04L 27/26
370/328
2009/0285193 A1 * 11/2009 Kim ................. H04L 5/0007
370/342
(Continued)

FOREIGN PATENT DOCUMENTS

TW   I316225 B   10/2009
TW   I321315 B   3/2010
(Continued)

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.8.0, Dec. 2015, 1-136.
(Continued)

*Primary Examiner* — Anh Vu H Ly
(74) *Attorney, Agent, or Firm* — Murphy, Bilak & Homiller, PLLC (57) ABSTRACT

Methods and apparatuses disclosed herein enable the use of Demodulation Reference Signal, DMRS, sequences that are numbered relative to an overall system bandwidth (30), while simultaneously enabling wireless communication devices (12) to determine the DRMS sequence elements mapped to their scheduled bandwidths (36) within the system bandwidth (30). Advantageously, the wireless communication devices (12) need not know the system bandwidth (30), or even be aware of where their scheduled bandwidths (36) reside within the system bandwidth (30).

12 Claims, 8 Drawing Sheets

(51) Int. Cl.
*H04L 5/00* (2006.01)
*H04W 72/04* (2009.01)
*H04W 74/04* (2009.01)
*H04B 17/336* (2015.01)

(52) U.S. Cl.
CPC .......... *H04L 5/0051* (2013.01); *H04L 5/0058* (2013.01); *H04L 5/0094* (2013.01); *H04L 27/2607* (2013.01); *H04L 27/2613* (2013.01); *H04L 27/2662* (2013.01); *H04L 27/2691* (2013.01); *H04W 72/042* (2013.01); *H04W 72/0453* (2013.01); *H04W 74/04* (2013.01); *H04B 17/336* (2015.01); *H04L 5/0007* (2013.01); *H04L 5/0044* (2013.01)

(56) References Cited

U.S. PATENT DOCUMENTS

| | | | | |
|---|---|---|---|---|
| 2011/0170629 | A1* | 7/2011 | Lee | H04L 5/0016 375/295 |
| 2011/0280203 | A1* | 11/2011 | Han | H04L 1/0031 370/329 |
| 2012/0087427 | A1* | 4/2012 | Noh | H04B 7/0613 375/260 |
| 2012/0250655 | A1* | 10/2012 | Noh | H04L 5/0023 370/330 |
| 2012/0329468 | A1 | 12/2012 | Chmiel et al. | |
| 2013/0064216 | A1* | 3/2013 | Gao | H04L 5/0016 370/330 |
| 2015/0023275 | A1* | 1/2015 | Kim | H04W 56/0045 370/329 |
| 2015/0071195 | A1* | 3/2015 | Park | H04L 5/0048 370/329 |
| 2015/0085793 | A1 | 3/2015 | Luo et al. | |
| 2016/0157287 | A1* | 6/2016 | Chae | H04L 5/0023 370/329 |
| 2017/0005765 | A1 | 1/2017 | Park et al. | |
| 2017/0288743 | A1* | 10/2017 | Nam | H04B 7/024 370/328 |
| 2018/0323942 | A1* | 11/2018 | Han | H04L 5/0007 370/328 |

FOREIGN PATENT DOCUMENTS

| | | |
|---|---|---|
| TW | I411302 B | 10/2013 |
| TW | I478545 B | 3/2015 |
| WO | 2008057899 A2 | 5/2008 |

OTHER PUBLICATIONS

Unknown, Author, "Demodulation Reference Signal Design Principles", 3GPP TSG-RAN WG1 #87, R1-1612325, Ericsson, Reno, USA, Nov. 14-18, 2016, pp. 1-4.

Unknown, Author, "On Reference Signal Enhancements for UL CoMP", 3GPP TSG RAN WG1, Meeting #67, R1-114324, Nokia Siemens Networks, Nokia, San Francisco, USA, Nov. 14-18, 2011, pp. 1-6.

* cited by examiner

METHODS AND APPARATUSES FOR SIGNALING AND DETERMINING REFERENCE SIGNAL OFFSETS

TECHNICAL FIELD

The present invention relates to communication networks and particularly relates to determining reference signal offsets in a communication network.

BACKGROUND

Networks based on the Long Term Evolution, LTE, specifications, as promulgated by the Third Generation Partnership Project, 3GPP, use two kinds of reference signals: Cell-specific Reference Signals or CRS, and Demodulation Reference Signals or DMRS, which are also denoted as DM-RS. CRS span the complete "system" bandwidth involved and they are "always on." In contrast, DMRS span only the scheduled bandwidth to which they pertain and they are only transmitted when transmitting data.

The advantage of reference signals that are always transmitted is that a wireless communication device, referred to as a UE or User Equipment in 3GPP parlance, can rely on their presence. Drawbacks associated with CRS include a high network energy consumption because CRS are even transmitted if no data are transmitted. CRS also create unnecessary interference because they are transmitted even if not needed.

Figure 1:
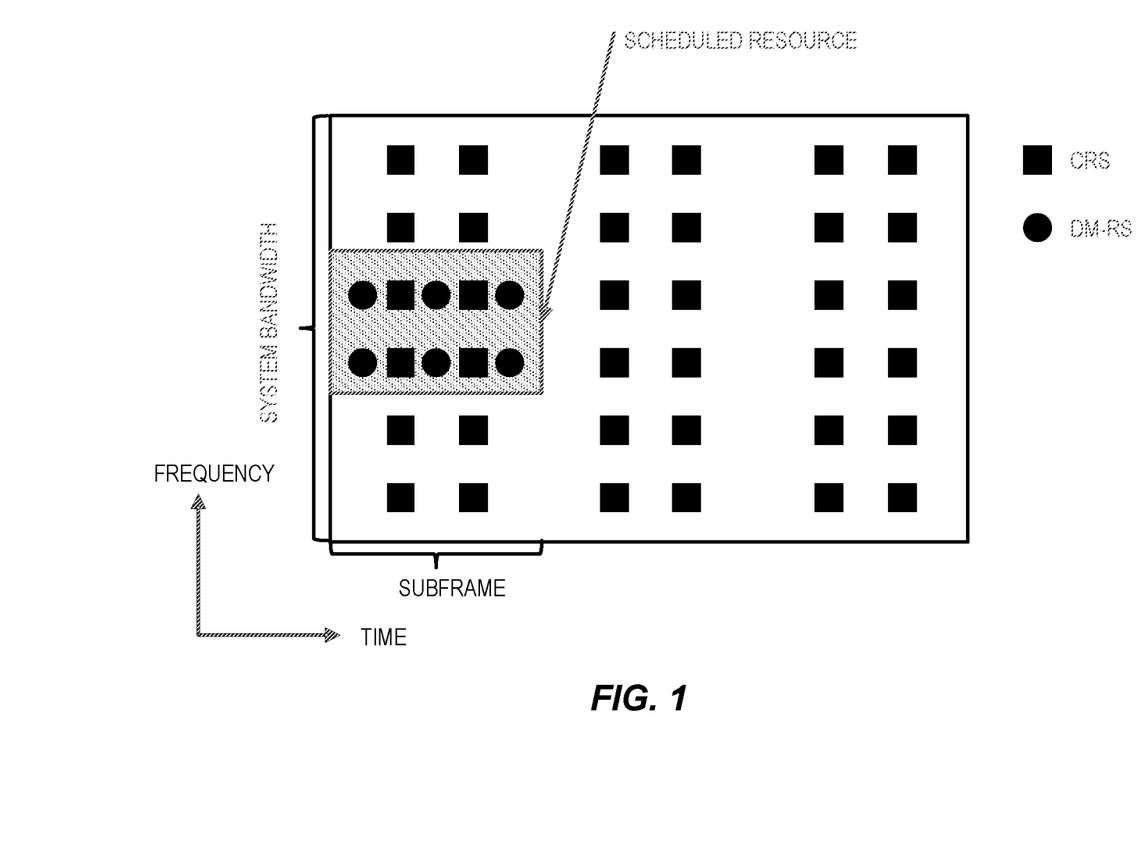
FIG. 1 is a diagram of example CRS and DMRS transmission.

See FIG. 1, which illustrates an example system bandwidth and the transmission of CRS and DMRS within the system bandwidth. In an Orthogonal Frequency Division Multiplex, OFDM, example applicable to the LTE context, the system bandwidth comprises a plurality of spaced-apart, narrow-band subcarriers that, in the aggregate, span the system bandwidth. Each subcarrier taken at each transmission time may be regarded as Resource Element, or RE, and FIG. 1 can be understood as depicting some portion of an OFDM time-frequency grid, with CRS and DMRS being transmitted on specific subcarriers at specific times. More particularly, one sees regular transmissions of CRS across the system bandwidth, along with the transmission of DMRS in conjunction with data transmission on scheduled resources.

In LTE, the DRMS sequence element transmitted on a given subcarrier depends on the position of the subcarrier within the overall plurality of subcarriers constituting the overall system bandwidth. For example, with the subcarriers are numbered from 0 to N, the sequence element associated with the m-th subcarrier depends on the value of m. This approach can be understood as a "global" numbering scheme that applies to the system bandwidth and, importantly, LTE UEs support the full system bandwidth.

In more detail, in LTE, for any of the antenna ports $p \in \{7,8, \ldots, v+6\}$, the reference-signal sequence r(m) used for DMRS on subcarrier m within the downlink, DL, system bandwidth $N_{RB}^{maxDL}$ resource blocks, is defined by $$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}.$$

The pseudo-random sequence c(i) is defined by a length-31 Gold sequence.

The output sequence c(n) of length $M_{PN}$, where n=0.1, $M_{PN}-1$, is defined by $$c(n) = (x_1(n+N_C) + x_2(n+N_C)) \mod 2$$

$$x_1(n+31) = (x_1(n+3) + x_1(n)) \mod 2$$

$$x_2(n+31) = (x_2(n+3) + x_2(n+2) + x_2(n+1) + x_2(n)) \mod 2$$

where $N_C=1600$ and the first m-sequence shall be initialized with $x_1(0)=1, x_1(n)=0, n=1,2,\ldots,30$. The initialization of the second m-sequence is denoted by $c_{init} = \Sigma_{i=0}^{30} x_2(i) \cdot 2^i$ with the value depending on the application of the sequence.

The pseudo-random sequence generator shall for DMRS in LTE be initialized with $$c_{init} = (\lfloor n_s/2 \rfloor + 1) \cdot (2n_{ID}^{(nSCID)} + 1) \cdot 2^{16} + n_{SCID}$$

at the start of each subframe.

The quantities $n_{ID}^{(i)}$, i=0,1, are given by
$n_{ID}^{(i)} = N_{ID}^{cell}$ if no value for $n_{ID}^{DMRSi}$ is provided by higher layers or if DCI format 1A, 2B or 2C is used for the DCI associated with the PDSCH transmission
$n_{ID}^{(i)} = n_{ID}^{DMRSi}$ otherwise where this value is indicated in the downlink control information used to schedule the PDSCH. Here, "DCI" denotes Downlink Control Information, and "PDSCH" denotes Physical Downlink Shared Channel.

It is recognized herein that certain complications arise concerning the generation and use of DRMS signals in the context of NR, where "NR" denotes the New Radio standard at issue in the ongoing development of next-generation communication networks, which are also referred to as 5G networks. NR contemplates wide system bandwidths—e.g., bandwidths of 1 GHz or more—and not every terminal operating in an NR system will have the capability to operate over the complete system bandwidth NR will, therefore, provide support for terminals capable of supporting only a fraction of the system bandwidth. For example, the network configures a portion of the system bandwidth for use by the terminal, referred to as terminal's configured bandwidth, and then uses bandwidth within the configured bandwidth for scheduling the terminal, referred to as the terminal's scheduled bandwidth.

A terminal may perform access to an NR carrier by detecting a synchronization signal and broadcast channel and performing a subsequent random access. After random access, the network could configure the terminal to a new frequency relative to the frequency used for initial access. This approach does not require the terminal to know the system bandwidth or know where its configured bandwidth lies within the system bandwidth.

SUMMARY

Methods and apparatuses disclosed herein enable the use of Demodulation Reference Signal, DMRS, sequences that are numbered relative to an overall system bandwidth, while simultaneously enabling wireless communication devices to determine the DRMS sequence elements mapped to their scheduled bandwidths within the system bandwidth. Advantageously, the wireless communication devices need not know the system bandwidth or even be aware of where their scheduled bandwidths reside within the system bandwidth.

An example method of operation at a wireless communication device includes determining, based on information received from a wireless communication network, a sequence offset for a reference signal sequence, e.g., a DMRS sequence. The method further includes determining, based on the sequence offset, which portion of the reference signal sequence overlays a scheduled bandwidth of the wireless communication device, referred to as an overlaying portion 44 of the reference signal sequence. Here, the scheduled bandwidth is a portion of a larger, system bandwidth associated with the network, and the reference signal sequence overlays the system bandwidth according to a defined mapping between respective sequence elements constituting the reference signal sequence and respective subcarriers constituting the system bandwidth.

In a corresponding example, a wireless communication device is configured for operation in a wireless communication network and comprises communication circuitry configured for wirelessly communicating with one or more nodes in the network, and processing circuitry that is operatively associated with the communication circuitry. The processing circuitry is configured to determine, based on information received from the network, a sequence offset for a reference signal sequence, and determine, based on the sequence offset, which portion of the reference signal sequence overlays a scheduled bandwidth of the wireless communication device. Such portion is referred to as an overlaying portion of the reference signal sequence. As before, the scheduled bandwidth is a portion of a larger, system bandwidth associated with the network, and the reference signal sequence overlays the system bandwidth according to a defined mapping between respective sequence elements constituting the reference signal sequence and respective subcarriers constituting the system bandwidth.

In another example embodiment, a method of operation at a network node configured for operation in a wireless communication network includes determining a value from which a wireless communication device can determine which portion of a reference signal sequence overlays a scheduled bandwidth of the wireless communication device. The scheduled bandwidth is within a configured bandwidth that is configured for the wireless communication device and within a larger system bandwidth, and the reference signal sequence overlays the system bandwidth according to a defined mapping between respective sequence elements comprising the reference signal sequence and respective subcarriers comprising the system bandwidth. The method further includes the network node signaling the value to the wireless communication device, thereby enabling the wireless communication device to determine the overlaying portion of the reference signal sequence and correspondingly identify which sequence elements of the reference signal sequence are associated with the subcarriers in the scheduled bandwidth.

In a corresponding example, a network node comprises communication circuitry configured to communicate directly or indirectly with a wireless communication device operating in the network. The network node further includes processing circuitry that is operatively associated with the communication circuitry and configured to determine a value from which a wireless communication device can determine which portion of a reference signal sequence overlays a scheduled bandwidth of the wireless communication device. That portion of the sequence is referred to as an overlying portion, and the scheduled bandwidth is within a configured bandwidth that is configured for the wireless communication device. In turn, the configured bandwidth is within a larger system bandwidth, and the reference signal sequence overlays the system bandwidth according to a defined mapping between respective sequence elements constituting the reference signal sequence and respective subcarriers constituting the system bandwidth.

The processing circuitry is further configured to signal the value to the wireless communication device. Such signaling enables the wireless communication device to determine the overlaying portion of the reference signal sequence and correspondingly identify which sequence elements of the reference signal sequence are associated with the subcarriers in the configured bandwidth.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 2:
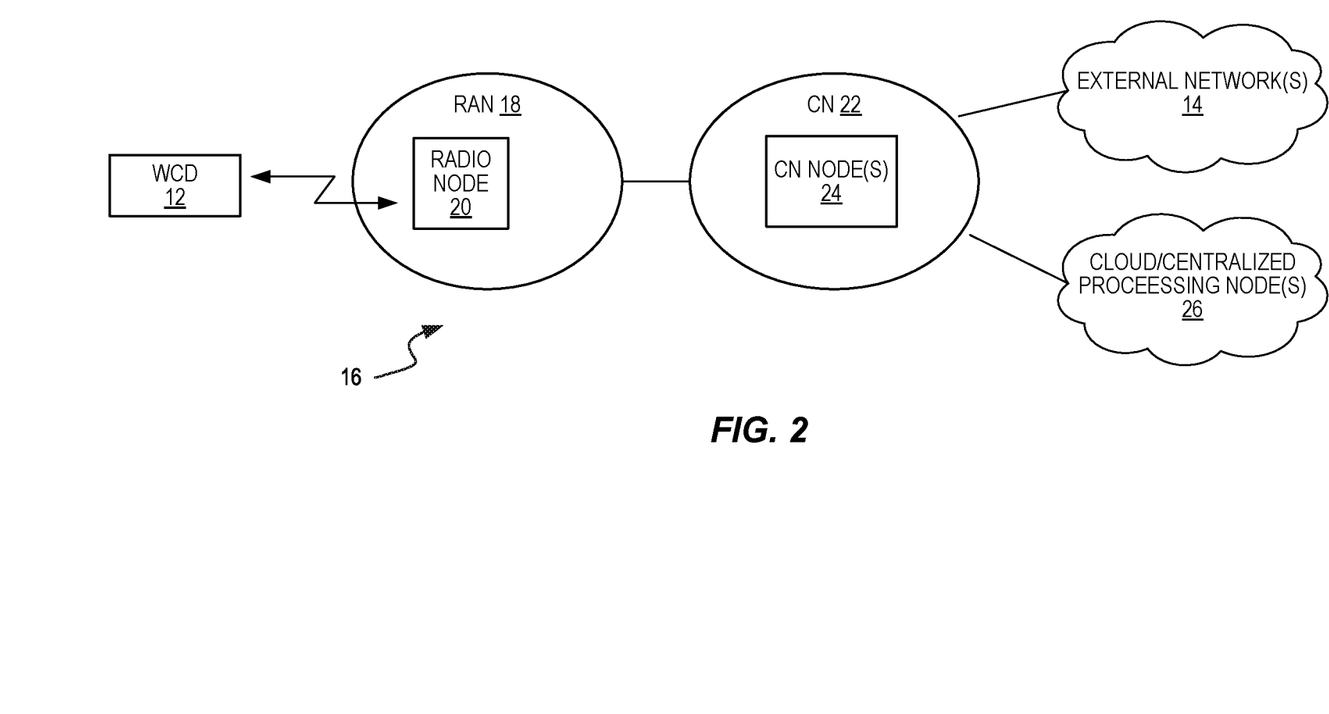
FIG. 2 is a block diagram of one embodiment of a wireless communication network.

FIG. 2 illustrates one embodiment of a wireless communication network 16, "network 16". The network 16 provides one or more communication services to a wireless communication device 12, "device 12", such as by communicatively coupling the device 12 to one or more external networks 14 such as the Internet or other Packet Data Networks, PDNs. The network 16 includes a Radio Access Network, RAN, 18. The RAN 18 includes one or more radio network nodes 20, which may be referred to as base stations, access points, transmission points, etc. A Core Network, CN, 22 provides, e.g., mobility management and packet routing for the device 12, and includes one or more CN nodes 24, such as packet gateways, mobility management entities, authentication servers, etc. The network 16 may further include or be associated with one or more cloud-based or centralized processing nodes that provide processing services for various functions within the network 16.

The diagram shall be understood as being simplified, as the network 16 may include multiple other nodes of the same or different types, and may include multiple radio network nodes 20 and may include more than one RAN and may operate with more than one Radio Access Technology, RAT. In one example, different types of radio network nodes 20 provide a heterogeneous radio access network, which may involve more than one RAT. Further, in the context of New Radio, NR, 5G implementations, the network 16 may use beamforming, e.g., wherein allocated beams within a potentially large plurality of beams from one or more radio network nodes 20 are used to provide coverage to the device 12.

Still further, unless otherwise noted, the terms "device," "wireless communication device," "user equipment," and "UE" are used interchangeably herein. Unless otherwise specified, the device 12 comprises essentially any apparatus configured for wirelessly connecting to the network 16 via any one or more of the Radio Access Technologies, RATs, used by the network 16. The device 12 may be mobile, although fixed devices are also contemplated, and non-limiting examples include cellular radiotelephones, which may be smartphones or feature phones, laptops, tablets, wireless modems or adapters, Machine-to-Machine, M2M, or Machine-Type-Communication, MTC, devices, Internet-of-Things, IoT, devices, etc.

Figure 3:
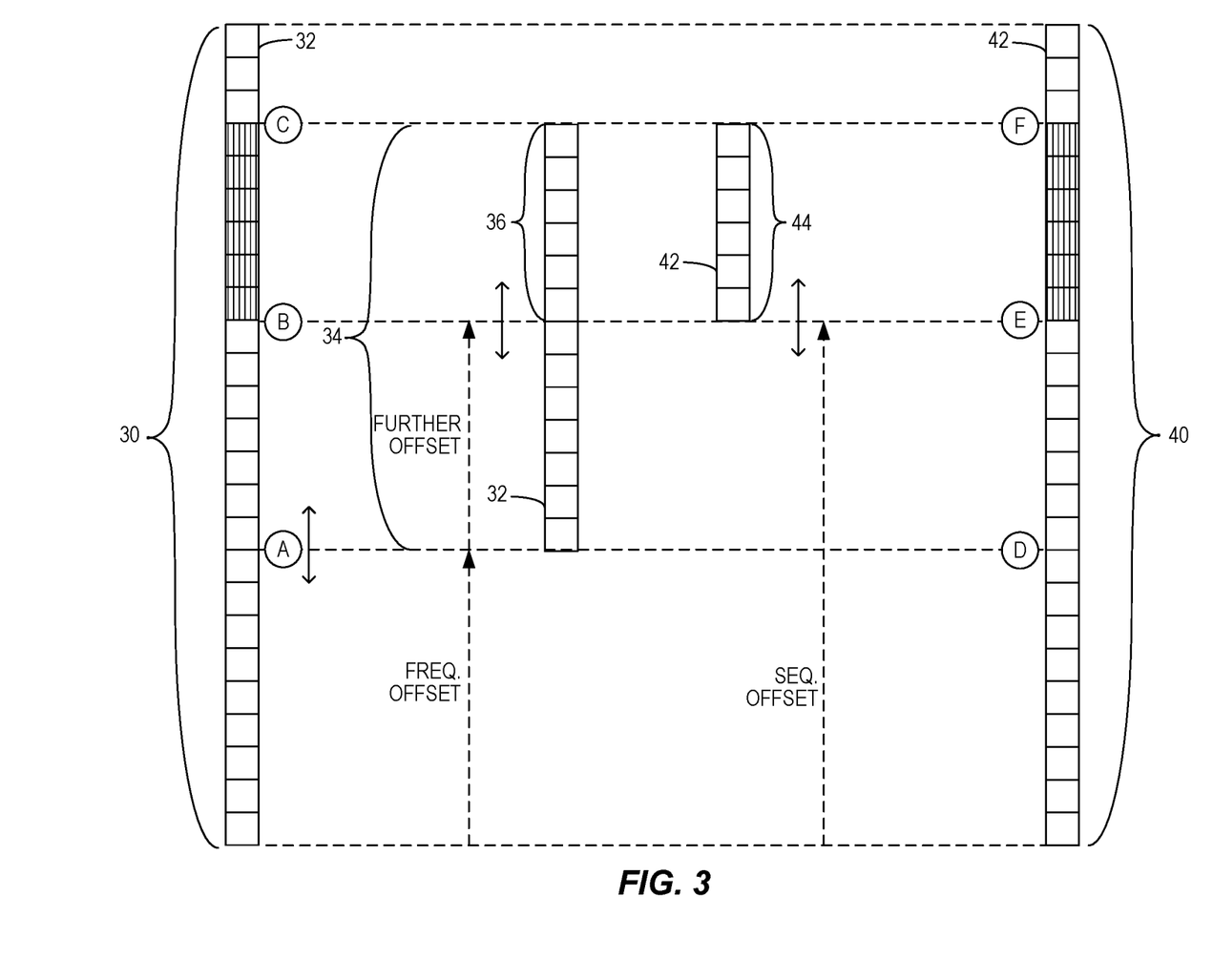
FIG. 3 is a diagram of one embodiment of a defined mapping between a reference signal sequence and a system bandwidth.

FIG. 3 depicts an example embodiment contemplated in the context of the device 12 and the network 16, where a system bandwidth 30 is associated with the network 16. As a non-limiting example, the system bandwidth represents the air-interface bandwidth supported by a radio network node 20 in the RAN 18, operating as an NR transmission point or transceiver. The device 12 supports a fraction of the system bandwidth 30, which constitutes a plurality of frequency subcarriers 32. The subcarriers 32 may be numbered from low to high frequency, high to low frequency, or according to some other ordered scheme. Thus, FIG. 3 may be regarded as depicting a scenario where the operation bandwidth capabilities of the radio network node 20 differ from the operation bandwidth capabilities of the device 12.

The device 12 is associated with a configured bandwidth 34, as configured by the network 16, which is contained with the system bandwidth 30 but comports with the bandwidth limitations of the device 12. The network 16 schedules the device 12, for data transmissions or receptions, using a scheduled bandwidth 36, which is contained with the configured bandwidth 34. A given node 20 in the RAN 18 may support many devices 12 within its system bandwidth 30 and may locate the corresponding configured bandwidths 34 at various positions within the overall system bandwidth 30.

As a non-limiting example, the collection of subcarriers 32 shown as constituting the system bandwidth 30—seen on the left side of the page—may be numbered according to some global scheme. Correspondingly, a reference signal sequence 40—seen on the right side of the page—maps to or aligns with the system bandwidth 30. The correspondence between respective sequence elements 42 in the reference signal sequence 40 and respective subcarriers 32 in the system bandwidth 30 is suggested by the horizontal alignment shown between them in the diagram.

However, the depicted mapping is shown by way of example and not limitation, and it will be appreciated that the general idea here is that there is a defined association between subcarriers 32 in the system bandwidth 30 and sequence elements 42 in the reference signal sequence 40. In an example, the reference signal sequence 40 comprises a DMRS sequence generated such that each sequence element 42 depends on the number of its corresponding subcarrier 32, which subcarriers 32 are numbered within the "global" system bandwidth 30. See, for example, the DMRS sequence generation scheme explained in the Background of this disclosure for LTE.

Within this framework, then, the sequence elements 42 that correspond to the subcarriers 32 included within the scheduled bandwidth 36 of a given device 12 depend on where the scheduled bandwidth 36 is positioned within the system bandwidth 30. In the diagramed example, the configured bandwidth 34 of the device 12 is positioned at a frequency offset relative to a starting point of the system bandwidth 30, and the scheduled bandwidth 36 is positioned at a further offset relative to the start of the configured bandwidth 34. Here, it may be noted that the scheduled bandwidth 36 size and position may vary within configured bandwidth 34, as part of ongoing scheduling operations. Referencing the global numbering of the system bandwidth 30, the configured bandwidth 34 starts at point A in the system bandwidth 30 and goes to point C in the system bandwidth 30, while the scheduled bandwidth 36 goes from points B to C.

Because the reference signal sequence 40 maps to, corresponds to, aligns with, or "overlays" the system bandwidth 30, according to a defined mapping, a particular portion 44 of the reference signal sequence 40 overlays the scheduled bandwidth 36 of the device 12. According to the labeling, the sequence elements 42 going from point E to point F in the reference signal sequence 40 overlay—map to—the subcarriers 32 going from point B to C in the system bandwidth 30. More generally, the sequence segment from point D to F overlays the bandwidth segment from point A to C.

Figure 4:
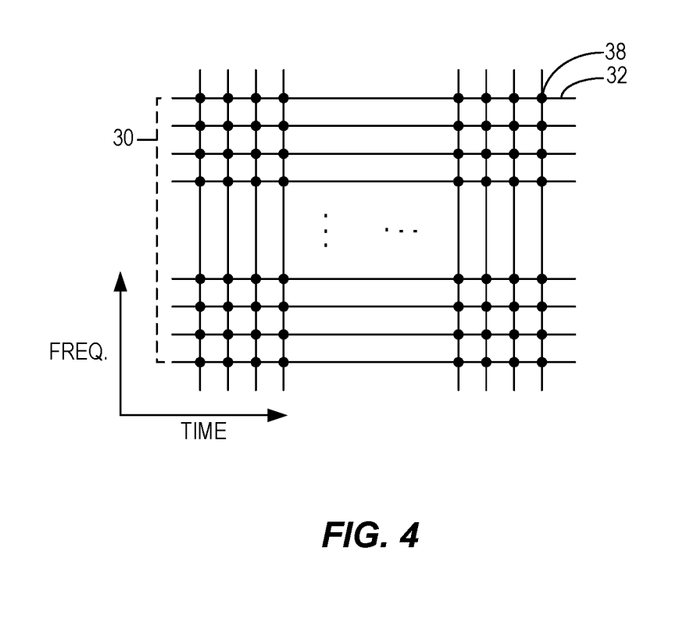
FIG. 4 is a diagram illustrating resource elements corresponding to a time-frequency grid.

FIG. 4 illustrates another view of the system bandwidth 30, this time shown in the context of a time-frequency grid, where the intersection between transmission times and subcarriers 32 represents "resource elements" or REs 38. It will be understood that the transmission or reception of a sequence element 42 on its corresponding subcarrier 32 means the transmission or reception on a resource element 38 defined on that subcarrier 32.

With the above framework in mind, methods and apparatuses disclosed herein enable the device 12 to determine the overlaying portion 44 of the reference signal sequence 40, without having to know the system bandwidth 30. In at least some embodiments, the device 12 determines the overlaying portion 44 of the reference signal sequence 40 without an explicit knowledge of where its scheduled bandwidth 36 is positioned within the system bandwidth 30.

Figure 5:
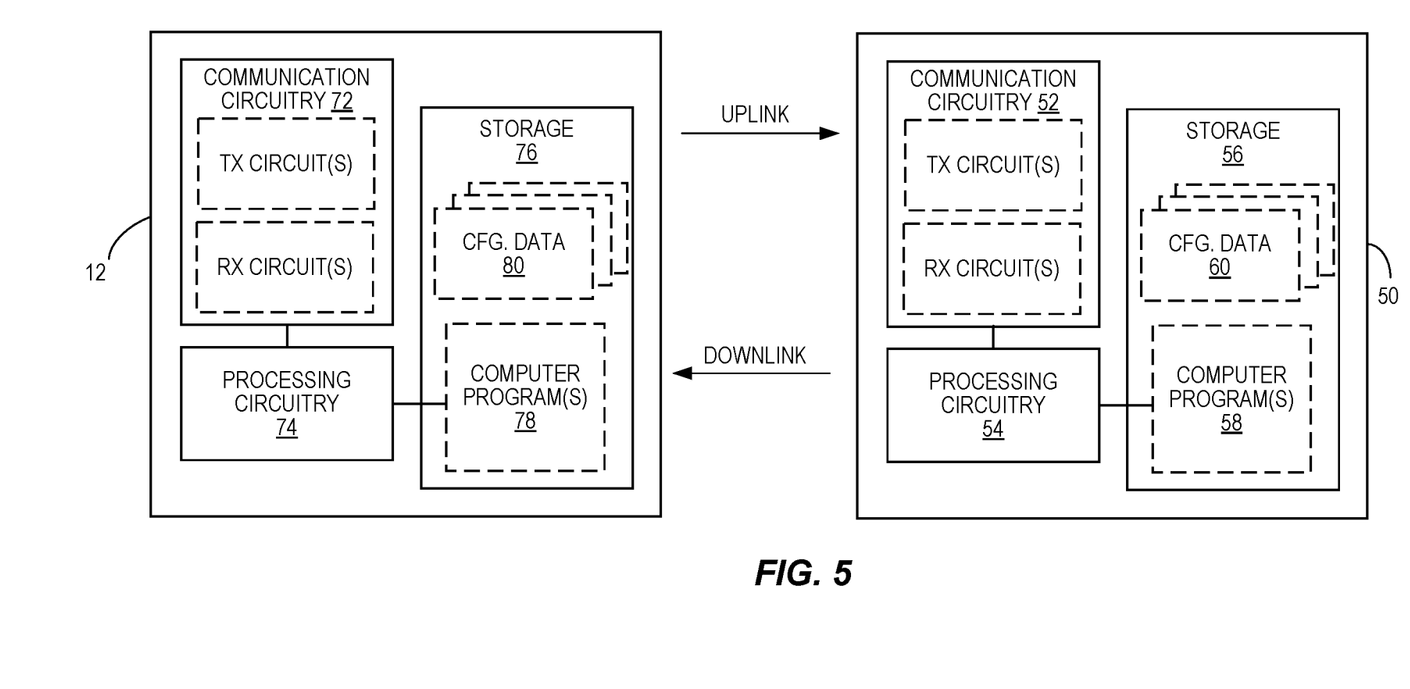
FIG. 5 is a block diagram illustrating example embodiments of a wireless communication device and a network node.

FIG. 5 depicts example embodiments of a device 12 and a network node 50, which are configured to carry out the respective device-side and network-side operations disclosed herein. The node 50 may be implemented in various network locations, such as in the RAN 18, in the CN 22, or as a cloud-based node 26. Further, the node 50 may comprise two or more nodes—i.e., its functionality may be distributed. In at least one embodiment, the node 50 is co-located with or implemented in the radio network node 20 seen in FIG. 2, and it will be understood that there may be multiple such nodes 20 in the network 16.

Wherever implemented, in an example embodiment the node 50 includes communication circuitry 52 that is configured for communicating directly or indirectly with the device 12. For example, the communication circuitry 52 includes radio frequency, RF, transceiver circuitry, i.e., transmit and receive circuits, configured for transmitting signals on the downlink to one or more devices 12 and for receiving signals on the uplink from such devices 12. Additionally, or alternatively, the communication circuitry 52 includes one or more network or computer data interfaces, for communicating with one or more other nodes in the network 16. In at least one such example, the node 50 communicates indirectly with the device 12 by sending signaling towards another node that provides the air interface for wirelessly coupling to the device 12.

The node 50 further includes processing circuitry 54 that is operatively associated with the communication circuitry 52 and includes or is associated with storage 56. The processing circuitry 54 comprises fixed circuitry, or programmed circuitry, or a mix of fixed and programmed circuitry. In at least one embodiment, the processing circuitry 54 comprises one or more microprocessors, Digital Signal Processors, DSPs, Field Programmable Gate Arrays, FPGAs, Application Specific Integrated Circuits, ASICS, or other digital processing circuitry. In at least one such embodiment, the processing circuitry 54 is configured according to the teachings herein based on its execution of computer program instructions stored in one or more computer programs 58 held in the storage 56. The storage 56 may further hold one or more items of configuration data 60 that are pre-provisioned and/or dynamically acquired by the processing circuitry 54.

In one or more embodiments, the storage 56 comprises one or more types of computer-readable media, such as a mix of nonvolatile memory circuits or disk storage, along with volatile, working memory. Non-limiting examples of non-volatile storage include Solid State Disk, SSD, storage, FLASH, and EEPROM, while non-limiting examples of volatile, working memory include DRAM or SRAM circuitry.

In at least one embodiment, the communication circuitry 52 is configured to communicate directly or indirectly with a device 12 operating in the network 16, and the processing circuitry 54 is operatively associated with the communication circuitry 52 and configured to perform several functions or operations. The processing circuitry 54 is configured to determine a value from which the device 12 can determine which portion of a reference signal sequence 40 overlays a scheduled bandwidth 36 of the device 12.

As before, that portion of the reference signal sequence 40 is referred to as an overlying portion 44, and the scheduled bandwidth 36 is in a configured bandwidth 34 that is configured for the device 12. In turn, the configured bandwidth 34 lies within the system bandwidth 30. A defined mapping determines the correspondence between sequence 40 and the system bandwidth 30, i.e., defines a mapping between respective sequence elements 42 constituting the reference signal sequence 40 and respective subcarriers 32 constituting the system bandwidth 30. Here, the configured bandwidth 34 for the wireless communication device 12 may be configured by the processing circuitry 54. Similarly, the scheduled bandwidth 36 may be dynamically selected by the processing circuitry 54, as part of a scheduling function implemented therein.

The processing circuitry 54 is further configured to signal the value to the device 12, thereby enabling the device 12 to determine the overlying portion 44 of the reference signal sequence 40 and correspondingly identify which sequence elements 42 of the reference signal sequence 40 are associated with the subcarriers 32 in the scheduled bandwidth 36. For example, the value may be signaled to the device 12 in conjunction with configuring the configured bandwidth 34.

The processing circuitry 54 in one example determines the value as a seed value for seeding a sequence element generation function at the wireless communication device. Because the seed value controls where in the reference signal sequence 40 the generator "begins", the processing circuitry 54 can provide the device 12 with the applicable sequence offset on an implicit basis. That is, the processing circuitry 54 can provide the device 12 with the seed value corresponding to the start of its configured bandwidth 34, such that sequence element generation at the device 12 begins with the first sequence element 42 in the configured bandwidth 34.

Because the device 12 knows the position of its scheduled bandwidth 36 within the configured bandwidth 34, knowing the starting sequence element 42 means that it knows the sequence elements 42 that correspond to the subcarriers 32 in its scheduled bandwidth 36—i.e., it knows the overlaying portion 44 of the reference signal sequence 40. Advantageously, the approach works without the device 12 having to know the system bandwidth 30 and without the device having to know the position of its configured bandwidth 34 within the system bandwidth 30. Significant reductions in signaling overhead and bandwidth management complexity attend the approach.

In another example, the processing circuitry 54 is configured to determine the value it signals to the device 12 as an offset value that identifies a sequence offset corresponding to the overlaying portion 44 of the reference signal sequence 40, or that identifies a position offset of the configured bandwidth 34 within the system bandwidth 30. In this latter case, the sequence offset is derivable at the wireless communication device 12. In a similar approach, the processing circuitry 54 is configured to determine the value as an offset value that relates the configured bandwidth 34 to a reference position within the system bandwidth 30.

In the same or another embodiment and with respect to an uplink transmission received at the network 16 from a device 12, the processing circuitry 54 is configured to determine which sequence elements from an uplink reference signal sequence are included in, or interfere with, the uplink transmission. The determination is based on a position of the scheduled bandwidth 36 within the system bandwidth 30 and the defined mapping.

Although the device 12 may be less complex than the node 50, it may similarly comprise digital processing circuitry and associated communication circuitry. From the example of FIG. 5, the device 12 includes communication circuitry 72 that is configured for receiving downlink signals from the network 16 and transmitting uplink signals to the network 16. For example, the communication circuitry 72 includes radio frequency, RF, transceiver circuitry configured for transmitting on the uplink to one or more radio network nodes 20 and for receiving on the downlink from one or more radio network nodes 20. The communication circuitry 72 may also support Device-to-Device, D2D, communications directly with other devices 12 and may include WLAN communications, Bluetooth communications, Near-Field Communication, NFC, etc.

The device 12 further includes processing circuitry 74 that is operatively associated with the communication circuitry 72 and includes or is associated with storage 76. The processing circuitry 74 comprises fixed circuitry, or programmed circuitry, or a mix of fixed and programmed circuitry. In at least one embodiment, the processing circuitry 74 comprises one or more microprocessors, DSPs, FPGAs, ASICS, or other digital processing circuitry.

In at least one such embodiment, the processing circuitry 74 is configured according to the teachings herein based on the execution of computer program instructions stored in one or more computer programs 78 held in storage 76. The storage 76 may further hold one or more items of configuration data 80 that are pre-provisioned and/or dynamically acquired by the processing circuitry 74. The configuration data 80 includes, for example, the value signaled to the device 12 by the network 16, for determining the overlaying portion 44 of the reference signal sequence 40.

In one or more embodiments, the storage 76 comprises one or more types of computer-readable media, such as a mix of nonvolatile memory circuits or disk storage and volatile, working memory. Non-limiting examples of non-volatile storage include SSD storage, FLASH, and EEPROM, while non-limiting examples of the volatile, working memory include DRAM or SRAM circuitry.

The communication circuitry 72 is configured for wirelessly communicating with one or more nodes in the network 16, e.g., with one or more radio network nodes 20. The processing circuitry 74 is operatively associated with the communication circuitry 72, e.g., it obtains data or control information via received signals incoming to the communication circuitry 72, and it sends data or control information via signals transmitted from communication circuitry 72. Further, the processing circuitry 74 is configured to determine, based on information received from the network 16, a sequence offset for a reference signal sequence 40 and determine, based on the sequence offset, which portion of the reference signal sequence 40 overlays a scheduled bandwidth 36 of the device 12.

The overlaying portion referred to as an overlaying portion 44 of the reference signal sequence 40 and, as noted before, the scheduled bandwidth 36 is a portion of a larger, system bandwidth 30 associated with the network 16. In this context, the reference signal sequence 40 overlays the system bandwidth 30 according to a defined mapping between respective sequence elements 42 constituting the reference signal sequence 40 and respective subcarriers 32 constituting the system bandwidth 30.

In an example embodiment, the processing circuitry 74 is configured to perform at least one of: transmit one or more of the sequence elements 42 contained in the overlaying portion 44 of the reference signal sequence 40; decode based on one or more of the sequence elements 42 contained in the overlaying portion 44 of the reference signal sequence 40; cancel interference based on one or more of the sequence elements 42 contained in the overlaying portion 44 of the reference signal sequence 40; and estimate a channel based on one or more of the sequence elements 42 contained in the overlaying portion 44 of the reference signal sequence 40.

In at least some embodiments, the information received from the network 16 directly or indirectly indicates a position of a configured bandwidth 34 within the system bandwidth 30. Correspondingly, the processing circuitry 74 is configured to determine the sequence offset based on the position of the configured bandwidth 34 and a position of the scheduled bandwidth 36 within the configured bandwidth 34. That is, the position of the configured bandwidth 34 within the system bandwidth 30 defines a first offset into the reference signal sequence 40, and the position of the scheduled bandwidth 36 within the configured bandwidth 34 defines a further offset into the reference signal sequence 40.

A seed value also may be provided by the network 16 as the information used by the processing circuitry 74 to determine the sequence offset. Here, the processing circuitry 74 is configured to determine the sequence offset implicitly, by using the seed value to seed a sequence element generation function, wherein the seed value is a function of the sequence offset. In operation, the sequence element generation function, as seeded by the seed value, generates sequence elements 42 corresponding to the configured bandwidth 34 of the device 12. The scheduled bandwidth 36 lies within the configured bandwidth 34 and the processing circuitry 74 is configured to determine the overlaying portion 44 of the reference signal sequence 40, based on a position of the scheduled bandwidth 36 within the configured bandwidth 34.

In another example, the information received from the network 16 indicates an offset relating a position of a configured bandwidth 34 of the device 12 to a reference position within the system bandwidth 30, e.g., a reference subcarrier. Correspondingly, the processing circuitry 74 is configured to determine the sequence offset based on the position of the configured bandwidth 34 in relation to the reference position, and further based on a position of the scheduled bandwidth 36 within the configured bandwidth 34.

Knowing which sequence elements 42 correspond to the subcarriers 32 in its scheduled bandwidth 36 enables the device 12 to perform one or more receive and/or transmit operations. For example, knowing which sequence element 42 maps to a given subcarrier 32 within its scheduled bandwidth 36 allows the processing circuitry 74 to estimate the interference arising at the device 16 from the reception of that sequence element 42 from another node or device in the network 16.

Here it should be understood that there may be more than one sequence element 40 defined within the network 16, e.g., a base sequence and one or more cyclically-shifted versions of the base sequence. If all such sequences 40 have the same element-to-subcarrier mapping defined relative to the system bandwidth 30, the device 16 may not know precisely which sequence element 42 it receives as interference, but it will know the set of possible sequence elements 42, which greatly limits the number of interference hypotheses it must consider.

Thus, in at least some embodiments, the processing circuitry 74 is configured to estimate interference at the device 12, as arising from a reference signal transmission by another device or node, as a function of one or more of the sequence elements 42 contained in the overlaying portion 44 of a reference signal sequence 40. The sequence elements 42 contained in the overlaying portion 44 of the reference signal sequence 40 depend on a cyclic shift used by the interfering node or device, and the processing circuitry 74 is configured to estimate the interference by hypothesizing the cyclic shift according to a known set of possible cyclic shifts.

Figure 6:
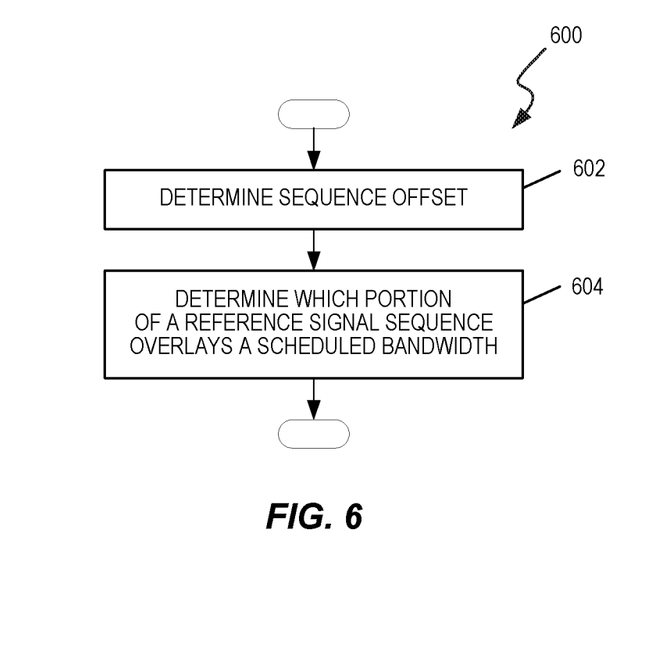
FIG. 6 is a logic flow diagram illustrating one embodiment of a method of processing at a wireless communication device.
Figure 7:
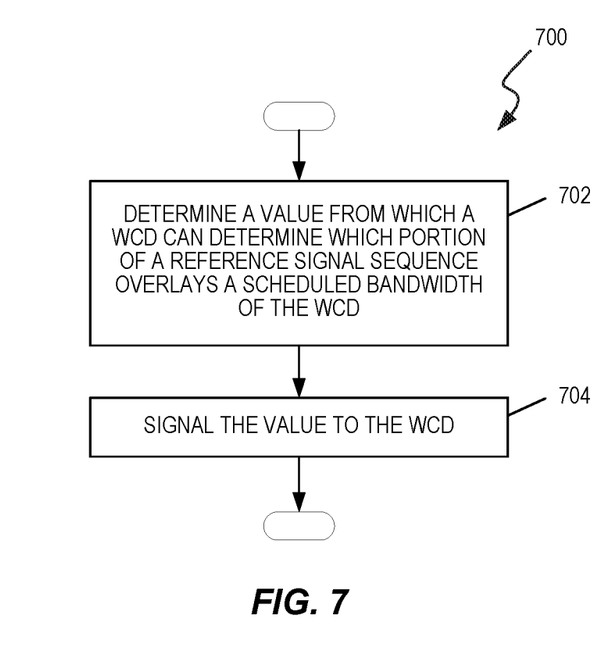
FIG. 7 is a logic flow diagram illustrating one embodiment of a method of processing at a network node.

FIGS. 6 and 7 depict example embodiments of processing at a device 12 and a network node 50, respectively. The method 600, as performed by a device 12, includes determining (Block 602), based on information received from the network 16, a sequence offset for a reference signal sequence 40, and determining (Block 604), based on the sequence offset, which portion of the reference signal sequence 40 overlays a scheduled bandwidth 36 of the device 12. The method 600 may further include an earlier step or operation of receiving the information in question, such as during a configuration operation in which the network 16 determines the configured bandwidth 34 of the device 16.

The method 700, as performed by a network node 50, includes determining (Block 702) a value from which a device 12 can determine which portion of a reference signal sequence 40 overlays a scheduled bandwidth 36 of the device 12, and signaling (Block 704) the value to the device 12. As before, the scheduled bandwidth 36 is contained within a configured bandwidth 34 of the device 12, and the method 700 may further include a step or operation of configuring the configured bandwidth 34 for the device 12 and signaling the value to the device 12 may occur in conjunction with the bandwidth configuration operations. Signaling such information to the device 12 enables it to determine the overlaying portion 44 of the reference signal sequence 40 and correspondingly identify which sequence elements 42 of the reference signal sequence 40 are associated with the subcarriers 32 in the scheduled bandwidth 36.

In further example details for at least some embodiments, an offset parameter, which may also be referred to as a "value" or as "information", is signaled from the network 16 to the device 12, which enables the device 12 to determine the sequence elements 42 of a reference signal sequence 40 that overlap with its scheduled bandwidth 36 or its configured bandwidth 34. The reference signal sequence 40 is, for example, a DMRS sequence, and its sequence elements are numbered globally, e.g., relative to the system bandwidth 30. The device 12 may not know the system bandwidth 30.

With the reference signal sequence 40 and its constituent sequence elements 42 being referred to as a DMRS sequence and DMRS sequence elements, one possibility is that the signaled parameter enables the device 12 to determine the DMRS sequence element that is mapped to the lowest frequency of its configured bandwidth 34. The offset parameter indicates the start of the DMRS sequence, for example. The offset parameter could, of course, be configured to indicate the DMRS sequence element mapped to other positions, such as the highest frequency, the middle frequency, etc.

Figure 8:
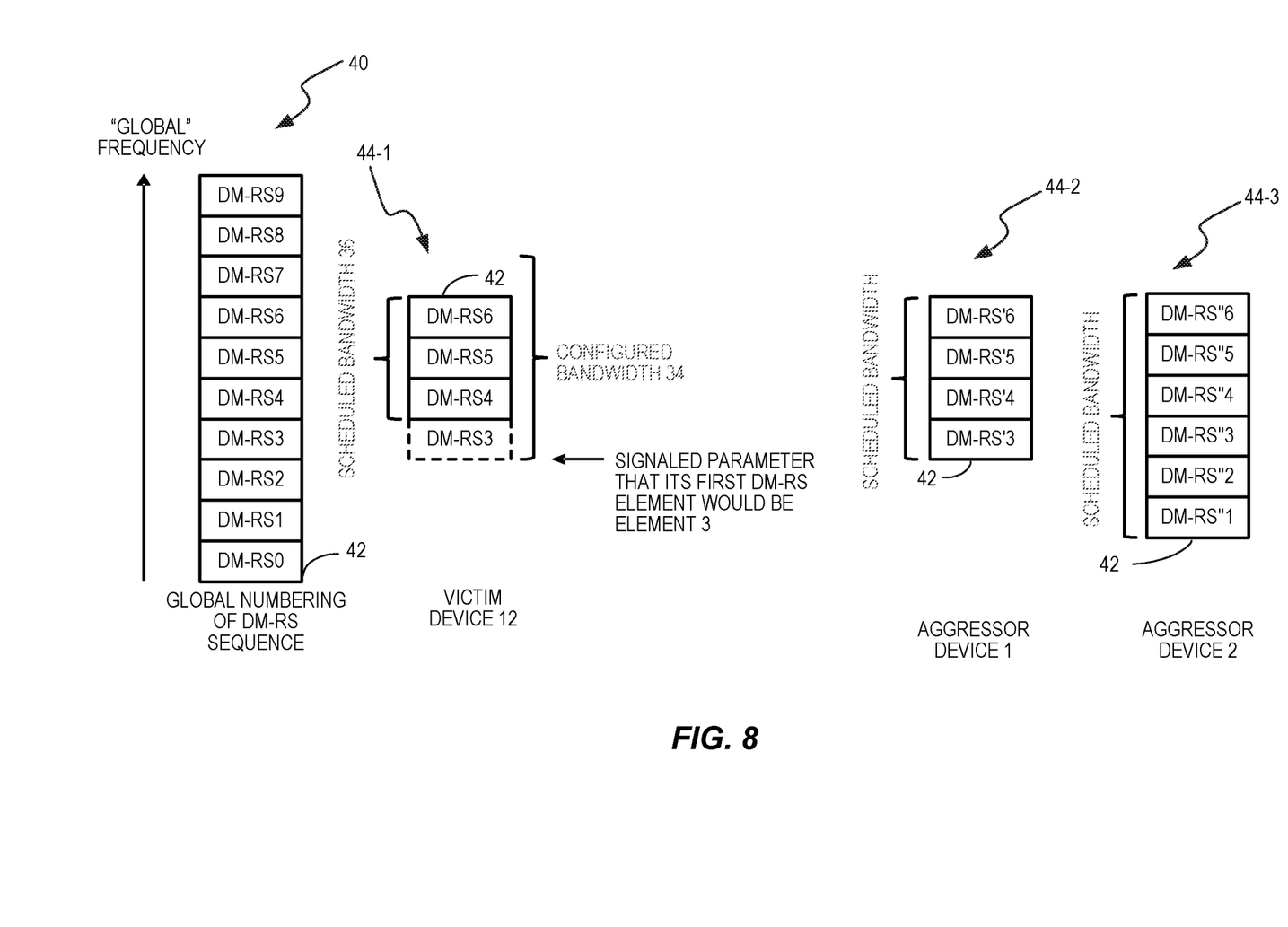
FIGS. 8 and 9 are diagrams illustrating example cases of victim and aggressor devices having overlapping scheduled bandwidths.

FIG. 8 depicts a corresponding example involving victim device 12 and two aggressor devices—e.g., the victim device 12 is a first UE and the two aggressor devices are other, nearby UEs. Based on the signaled parameters, the device 12 can determine that DMRS sequence element 3 is the sequence element that maps to the first DMRS position within its configured bandwidth 34. So, in the simplest case, the parameter signaled to the device 12 by the network 16 could indicate "3".

The signaled parameter—3 in the example—together with the scheduling assignment, which typically is relative to the device's configured bandwidth 34, enables the device 12 to determine the DMRS sequence positions that correspond to the frequency positions represented by its scheduled bandwidth 36. That is, in FIG. 8, receiving the signaled value of "3" from the network 16 enables the device 12 to know that the bottom frequency position of its configured bandwidth 34 is "3", which corresponds to the DMRS sequence position 3, DRMS3. As the device 12 knows the position of its scheduled bandwidth 36 within the configured bandwidth 34, the device 12 then knows that the frequency positions contained in its scheduled bandwidth correspond to or map with DMRS sequence positions 4, 5, and 6.

The actual values of the DMRS sequence elements that map to its scheduled bandwidth 36 can be derived from device 12 specific parameters and/or cell-wide parameters such as virtual cell ID. In principle, it is also possible that the signaled parameter directly indicates the first or a specified DMRS sequence element of the scheduled bandwidth 36 instead of the configured bandwidth 34. However, there may be certain advantages associated with relating the parameter to the configured bandwidth 34. For example, the parameter would need to be signaled only with changes in the configured bandwidth 34.

If the device 12 only supports a fraction of the system bandwidth 30, the device 12 is configured with a bandwidth after the device 12 makes an initial access. In at least one embodiment, the parameter required to determine the DMRS sequence alignment with the device's scheduled bandwidth 36 is derivable at the device 12 from the configuration and explicit signaling is not needed.

In a related embodiment, a reference subcarrier in the system bandwidth 30 is defined. For example, the primary synchronization signal, PSS, is transmitted by the network 16 and received and detected by the device 12. The center position of the detected PSS can be identified as the reference subcarrier, or, more generally, any subcarrier 32 in the system bandwidth 30 can be defined as a reference subcarrier. The operating bandwidth that is configured to the device 12 is signaled, by indicating a frequency distance relative to the reference subcarrier 32. The distance may be indicated in terms of subcarriers 32, or corresponding Resource Blocks, etc.

The DMRS sequence r(m) is generated per subcarrier m relative to the reference subcarrier, where m may be both positive and negative, as to create a global numbering scheme. Knowing the frequency distance from the reference subcarrier, although it is outside the operating bandwidth for the device 12, enables the device 12 to determine the DMRS sequence for its scheduled resource blocks.

Now consider the aggressor devices 1 and 2 seen in FIG. 8. Each aggressor device has a scheduled bandwidth that at least partially overlaps the scheduled bandwidth 36 of the device 12. With the global numbering scheme, any frequency position that is common between the scheduled bandwidth 36 of the device 12 and the aggressor devices 1 and 2 will map to the same DMRS sequence position. Thus, if the device 12 knows which DMRS sequences could be in use at the aggressor devices, it knows precisely which DMRS sequence elements could be received at the device 12 from the aggressor devices, on the subcarriers 32 included in its scheduled bandwidth 36.

For example, there may be a limited number of DMRS sequences defined, e.g., by using a base DMRS sequence and a defined set of cyclic shifts. Each cyclic shift can be thought of as producing a different DMRS sequence. However, the sequence elements in each such DMRS sequence all observe the global mapping, i.e., the sequence positions in each DMRS sequence map to the frequency positions of the system bandwidth 30 per the same global numbering and mapping. Thus, the actual value of the sequence element in sequence position "x" in a first DMRS sequence will differ from the value of sequence element in sequence position "x" in a second DMRS sequence. However, the sequence position "x" from both sequences maps to the same frequency position in the global system bandwidth. Therefore, assuming as a simplified example that there are five DRMS sequences that could be used by a transmitter, there are no more than five possible sequence element values that could be transmitted by the transmitter in the sequence position "x". Correspondingly, for a subcarrier 32 corresponding to the sequence position "x", a receiver being interfered with by those transmissions could limit its interference hypotheses to the set of five possible sequence element values.

In other words, if the device 12 knows the DMRS sequences that are possible for use at the aggressor devices—e.g., knows the possible cyclic shifts—it knows the universe of values possible for the DRMS sequence element(s) it receives on the subcarrier 32 corresponding to the involved sequence position. As seen in the figure, due to the global numbering of the DMRS sequence elements, the interfering DMRS sequence elements from the aggressor devices 1 and 2 overlapping the scheduled bandwidth 36 of the device 12 are also elements 4 to 6. To cancel DM-RS interference, the device 12 needs only to test one or a few sequence candidates, but not different sequence positions.

The device 12 could, for example, know the cell ID from neighboring transmission points—e.g., radio network nodes 20—and derive the one or few DM-RS sequences connected to the transmission point from the virtual cell ID of that transmission point.

Another possibility for the network 16 to provide the information needed by the device 12 to determine the DMRS sequence positions that correspond to the frequency positions of its scheduled bandwidth 36 is to signal a seed value. Often the sequence used for DMRS is a pseudo-random sequence generated by a pseudo random sequence generator that is initialized with a specified seed value, e.g., c_init. The pseudo random sequence generator could be initialized with a seed value and generates a sequence which is then mapped to the global DMRS sequence starting with sequence element 0, which is mapped to the lowest DM-RS element within the system bandwidth 36.

In FIG. 8, the 4th sequence element is the first DM-RS element within the configured bandwidth 34 of the device 12. Thus, the pseudo random sequence generator in the device 12 could be configured with the seed value that produces the same pseudo random sequence but starting with sequence element 4, labeled as DMRS3 in the diagram. In a further embodiment, there is a set of possible seed values c_init, corresponding to a set of reference subcarriers within the system bandwidth. The device 12 is signaled the offset to the nearest reference subcarrier and the identity of the reference subcarrier. To generate the DMRS sequence r(m), corresponding to a c_init, the shift register values need to be stored. For example, if m-sequences are used as in LTE, x_1(n), x_2(n) needs to be stored for a range of n. A device 12 can store the shift register memory values corresponding to the sequence elements mapped to a set of reference subcarriers, e.g., with 100 MHz spacing. Depending if the device 12 is located to 0 to 100 MHz (original c_init) or n*100 to (n+1)*100 MHz (n=1,2,3, three c_init values) it would initialize the random generator with the original c_init or one of the three other c_init values. The benefit of this is that the forward generation of a sequence would be limited to at most 100 MHz, which is the longest distance from the device's configured bandwidth 34 to a reference subcarrier. Otherwise, for very large system bandwidths, e.g., 1 GHz, the forward generation of the sequence r(m) to the configured bandwidth 34 would be demanding.

Broadly, the network 16 in one or more embodiments is configured to signal a parameter to a device 12 that the device 12 uses to determine its reference signal, i.e., to determine which portion of a reference signal sequence corresponds to its scheduled bandwidth 36. This arrangement enables the device 12 to determine which DMRS sequence elements apply to the scheduled bandwidth 36, without the device 12 having to know the system bandwidth 30 or the position of its scheduled bandwidth 36 within the system bandwidth 30. Such an approach allows the network 16 to relate or map DMRS sequence positions to frequency positions in the system bandwidth 30 using a global numbering scheme.

The parameter signaled by the network 16 to a device 12 could be an offset parameter that informs the device 12 which part to "cut out" of a global DMRS sequence, e.g., it could be the reference signal sequence element number that maps to the beginning of the configured bandwidth 34 of the device 12. This parameter, together with the device's knowledge of where its scheduled bandwidth 36 is within its configured bandwidth 34, would enable the device 12 to determine the reference signal sequence elements mapped to its scheduled bandwidth 36. The signaled parameter could also be a seed parameter that informs the device 12 how to initialize its pseudo random sequence generator, assuming a pseudo random sequence is used for DM-RS. The first generated sequence element would again correspond to the reference signal sequence element mapped to the beginning of the device's configured bandwidth 34.

Such operations enable a global numbering of DMRS sequences relative to system bandwidth, even if the device 12 is not aware of the system bandwidth 30 or its bandwidth position relative to the system bandwidth 30. Independent of victim and aggressor frequency position, a victim device 12 knows which sequence element numbers of the aggressor DM-RS sequence overlap its scheduled bandwidth 36 and by that can easily cancel the interfering DMRS. In the simplest case, the DMRS only depend on the cell ID or a similar parameter such as virtual cell ID; if the victim device 12 knows the cell ID of the interfering node it also knows the interfering sequence elements. In a practical setup, a given transmission point may be associated with one cell ID but may create pseudo orthogonal reference signals. Even in this case, if the victim device 12 knows the cell ID it only has to test a few candidate sequences to cancel interference arising at the device 12 from transmission of the reference signal(s) by the transmission point.

Figure 9:
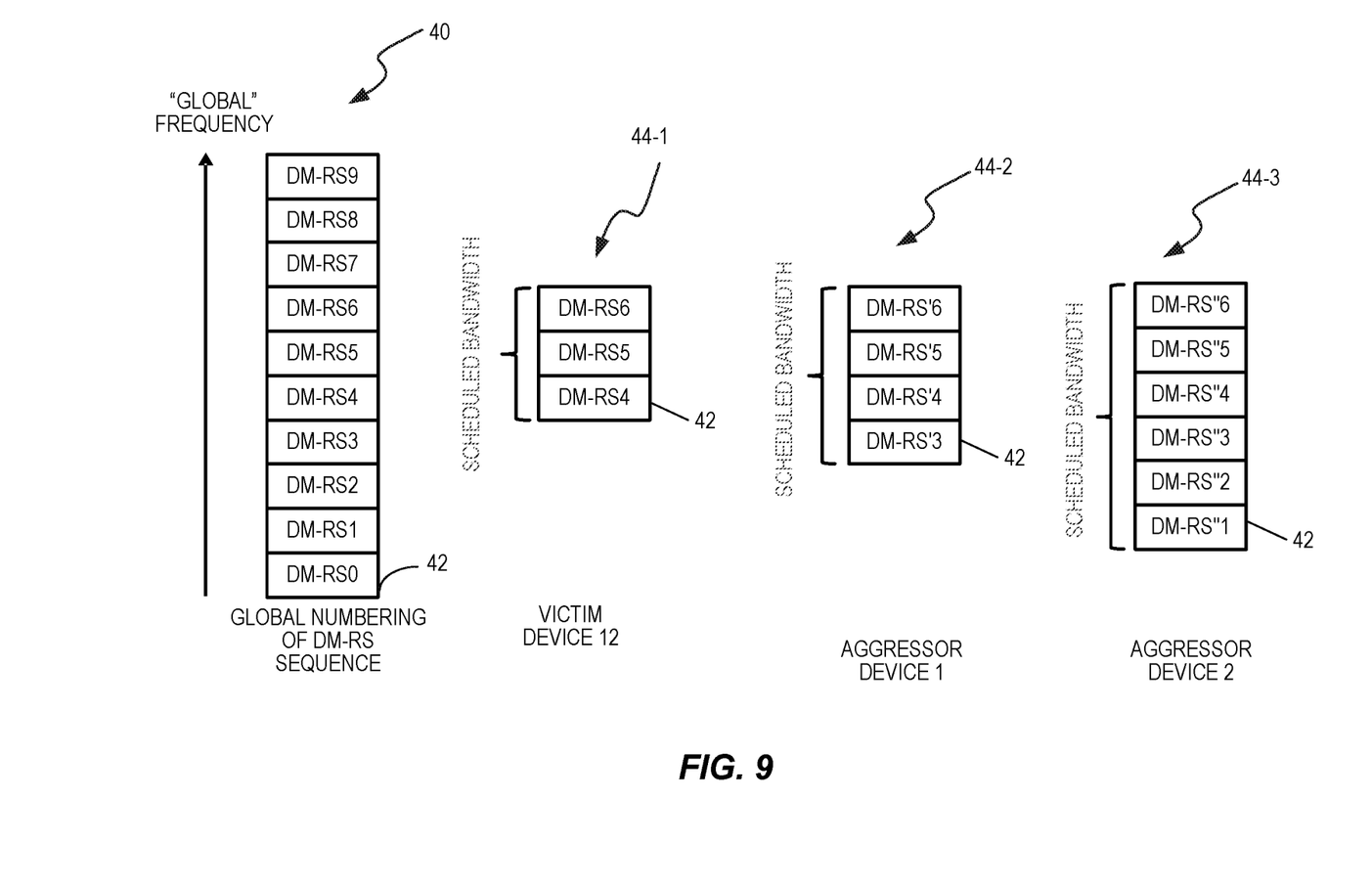

FIG. 9 emphasizes this scenario by showing the global alignment between reference signal sequence positions for a victim device 12 and two aggressor devices 1 and 2. Particularly, one sees that the same sequence position numbering—which generally relates to the frequency position numbering of the system bandwidth 30—applies to the victim device 12 and to the aggressor devices 1 and 2. That is, the portion 44-1 of a reference signal sequence that overlays the scheduled bandwidth of the victim device 12 uses the same sequence position numbering/mapping as is used for the portions 44-2 and 44-3 that overlay the scheduled bandwidths of the aggressor devices 1 and 2. Note that actual reference signal sequences are not necessarily the same for the three devices. That is, the sequence element associated sequence position 4 in each of the overlaying portions 44-1, 44-2, and 44-3, may have a different value, but the alignment or mapping of that sequence position is the same for all three devices.

Taking a broad understanding of the above details, one or more reference signal sequences 40 are available or defined for use in a wireless communication network 16. Each such reference signal sequence 40 comprises a series or set of sequence elements 42, with each sequence element occupying a corresponding position in the reference signal sequence 40. The network 16, e.g., a given radio network node 20, uses a global numbering scheme for its system bandwidth 30, e.g., a global numbering scheme for the frequency subcarriers 32 constituting its system bandwidth 30. Each subcarrier 32 may be regarded as occupying a frequency position, and the network 16 uses a defined mapping that relates reference signal positions to frequency positions.

A device 12 is configured with a configured bandwidth 34, where the configured bandwidth 34 is positioned somewhere within the system bandwidth 30. In operation, the device 12 uses a scheduled bandwidth 36 that occupies all or a portion of the configured bandwidth 34. Because of the defined mapping or alignment between reference signal sequence positions and frequency positions, the sequence positions that correspond with the frequency positions associated with the device's scheduled bandwidth 36 are dictated by where the scheduled bandwidth 36 is positioned within the system bandwidth 30. However, according to the teachings herein, the device 12 does not need to know the system bandwidth 30, or even know the position of its configured/scheduled bandwidth 34/36, to know which reference signal sequence positions correspond to its scheduled bandwidth 36. Those needs are obviated by the network 16 signaling information to the device 12 from which the device 12 can implicitly or explicitly determine the sequence offset corresponding to its system bandwidth 36.

Notably, modifications and other embodiments of the disclosed invention(s) will come to mind to one skilled in the art having the benefit of the teachings presented in the foregoing descriptions and the associated drawings. As one example, the teachings herein have applicable both to the uplink and the downlink in a wireless communication network. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation at a wireless communication device configured for operation in a wireless communication network, the method comprising:
   determining, based on information received via a downlink transmission from a radio network node of the network, a sequence offset for a reference signal sequence;
   determining, based on the sequence offset, which portion of the reference signal sequence overlays a scheduled bandwidth of the wireless communication device, referred to as an overlaying portion of the reference signal sequence; and
   transmitting, as an uplink transmission, one or more of the sequence elements contained in the overlaying portion of the reference signal sequence;
   wherein the scheduled bandwidth is a portion of a larger, system bandwidth associated with the network, and wherein the reference signal sequence overlays the system bandwidth according to a defined mapping between respective sequence elements constituting the reference signal sequence and respective subcarriers constituting the system bandwidth.

2. The method of claim 1, wherein the information received from the network directly or indirectly indicates a position of a configured bandwidth within the system bandwidth, and wherein determining the sequence offset comprises determining the sequence offset based on the position of the configured bandwidth and a position of the scheduled bandwidth within the configured bandwidth.

3. The method of claim 1, wherein the information received from the network indicates a seed value, and wherein determining the sequence offset comprises implicitly determining the sequence offset by using the seed value to seed a sequence element generation function, wherein the seed value is a function of the sequence offset.

4. The method of claim 3, wherein the sequence element generation function, as seeded by the seed value, generates sequence elements corresponding to a configured bandwidth of the wireless communication device, which configured bandwidth contains the scheduled bandwidth, and wherein the method includes determining the overlaying portion of the reference signal sequence, based on a position of the scheduled bandwidth within the configured bandwidth.

5. The method of claim 1, wherein the defined mapping maps respective sequence elements constituting the reference signal sequence to respective subcarriers constituting the system bandwidth.

6. The method of claim 1, wherein the information received from the network indicates an offset relating a position of a configured bandwidth of the wireless communication device to a reference position within the system bandwidth, and wherein determining the sequence offset comprises determining the sequence offset based on the position of the configured bandwidth in relation to the reference position, and further based on a position of the scheduled bandwidth within the configured bandwidth.

7. A wireless communication device configured for operation in a wireless communication network and comprising:
   communication circuitry configured for wirelessly communicating with one or more nodes in the network; and
   processing circuitry operatively associated with the communication circuitry and configured to:
      determine, based on information received via a downlink transmission from a radio network node of the network, a sequence offset for a reference signal sequence;
      determine, based on the sequence offset, which portion of the reference signal sequence overlays a scheduled bandwidth of the wireless communication device, referred to as an overlaying portion of the reference signal sequence; and
      transmit, as an uplink transmission, one or more of the sequence elements contained in the overlaying portion of the reference signal sequence;
      wherein the scheduled bandwidth is a portion of a larger, system bandwidth associated with the network, and wherein the reference signal sequence overlays the system bandwidth according to a defined mapping between respective sequence elements constituting the reference signal sequence and respective subcarriers constituting the system bandwidth.

8. The wireless communication device of claim 7, wherein the information received from the network directly or indirectly indicates a position of a configured bandwidth within the system bandwidth, and wherein the processing circuitry is configured to determine the sequence offset based on the position of the configured bandwidth and a position of the scheduled bandwidth within the configured bandwidth.

9. The wireless communication device of claim 7, wherein the information received from the network indicates a seed value, and wherein the processing circuitry is configured to determine the sequence offset implicitly, by using the seed value to seed a sequence element generation function, wherein the seed value is a function of the sequence offset.

10. The wireless communication device of claim 9, wherein the sequence element generation function, as seeded by the seed value, generates sequence elements corresponding to a configured bandwidth of the wireless communication device, which configured bandwidth contains the scheduled bandwidth, and wherein the processing circuitry is configured to determine the overlaying portion of the reference signal sequence, based on a position of the scheduled bandwidth within the configured bandwidth.

11. The wireless communication device of claim 7, wherein the defined mapping maps respective sequence elements constituting the reference signal sequence to respective subcarriers constituting the system bandwidth.

12. The wireless communication device of claim 7, wherein the information received from the network indicates an offset relating a position of a configured bandwidth of the wireless communication device to a reference position within the system bandwidth, and wherein the processing circuitry is configured to determine the sequence offset based on the position of the configured bandwidth in relation to the reference position, and further based on a position of the scheduled bandwidth within the configured bandwidth.

* * * * *